(12) United States Patent
Lee et al.

(10) Patent No.: US 12,062,365 B2
(45) Date of Patent: Aug. 13, 2024

(54) APPARATUS AND METHOD FOR TRAINING DIALOGUE SUMMARY MODEL

(71) Applicant: SAMSUNG SDS CO., LTD., Seoul (KR)

(72) Inventors: Hyun Jae Lee, Seoul (KR); Hyun Jin Choi, Seoul (KR); Jae Woong Yun, Seoul (KR); Ju Dong Kim, Seoul (KR); Bong Kyu Hwang, Seoul (KR); Seong Ho Joe, Seoul (KR); Young June Gwon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 268 days.

(21) Appl. No.: 17/514,338

(22) Filed: Oct. 29, 2021

(65) Prior Publication Data
US 2022/0310075 A1 Sep. 29, 2022

(30) Foreign Application Priority Data

Mar. 24, 2021 (KR) .................. 10-2021-0037976
May 28, 2021 (KR) .................. 10-2021-0069043

(51) Int. Cl.
*G10L 15/18* (2013.01)
*G06F 40/35* (2020.01)
*G10L 15/06* (2013.01)
*G10L 15/22* (2006.01)

(52) U.S. Cl.
CPC ............ *G10L 15/18* (2013.01); *G10L 15/063* (2013.01); *G10L 15/22* (2013.01); *G10L 2015/223* (2013.01)

(58) Field of Classification Search
CPC ................................. G06N 20/00; G06N 3/08
See application file for complete search history.

(56) References Cited

U.S. PATENT DOCUMENTS

| 2020/0250377 A1* | 8/2020 | Jiang | G06F 40/289 |
| 2020/0285663 A1* | 9/2020 | Karn | G06N 3/045 |
| 2022/0108086 A1* | 4/2022 | Wu | G06F 40/35 |

OTHER PUBLICATIONS

Rothe, S., Narayan, S., and Severyn, A. "Leveraging pretrained checkpoints for sequence generation tasks." arXiv preprint arXiv:1907.12461, Apr. 16, 2019. (Year: 2019).*
Ruijian Xu, Chongyang Tao, Daxin Jiang, Xueliang Zhao, Dongyan Zhao, Rui Yan, "Learning an Effective Context-Response Matching Model with Self-Supervised Tasks for Retrieval-based Dialogues," in arXiv:2009.06265v1, Sep. 14, 2020 (Year: 2020).*

(Continued)

*Primary Examiner* — Paras D Shah
(74) *Attorney, Agent, or Firm* — Sughrue Mion, PLLC

(57) ABSTRACT

An apparatus for training a dialogue summary model according to an embodiment includes a parameter transferer configured to transfer one or more learning parameter values of a pre-trained natural language processing model to a sequence-to-sequence-based dialogue summary model, and a model trainer configured to train the dialogue summary model by using the transferred learning parameter values as initial values for learning parameters of each of an encoder and a decoder in the dialogue summary model.

22 Claims, 10 Drawing Sheets

(56) References Cited

OTHER PUBLICATIONS

Jacob Devlin, Ming-Wei Chang, Kenton Lee, and Kristina Toutanova. BERT: pre-training of deep bidirectional transformers for language understanding. arXiv:1810.04805 May 24, 2019. (Year: 2019).*

Kaitao Song, Xu Tan, Tao Qin, Jianfeng Lu, Tie-Yan Liu, "MPNet: Masked and Permuted Pre-training for Language Understanding", in arXiv:2004.09297, Nov. 2, 2020 (Year: 2020).*

H. Wang, X. Wang, W. Xiong, M. Yu, X. Guo, S. Chang, and W. Y. Wang, "Self-supervised learning for contextualized extractive summarization," in Proceedings of the 57th Annual Meeting of the Association for Computational Linguistics, Jul. 2019. (Year: 2019).*

Yang Liu, Mirella Lapata, "Text Summarization with Pretrained Encoders." arXiv:1908.08345 is cited to disclose how BERT can be usefully applied in text summarization, Sep. 5, 2019 (Year: 2019).*

Joshi, Mandar, et al. "Spanbert: Improving pre-training by representing and predicting spans." Transactions of the association for computational linguistics 8 (2020): 64-77.*

Wang, Tianyi, et al. "Masking orchestration: Multi-task pretraining for multi-role dialogue representation learning." Proceedings of the AAAI Conference on Artificial Intelligence. vol. 34. No. 05. 2020.*

\* cited by examiner

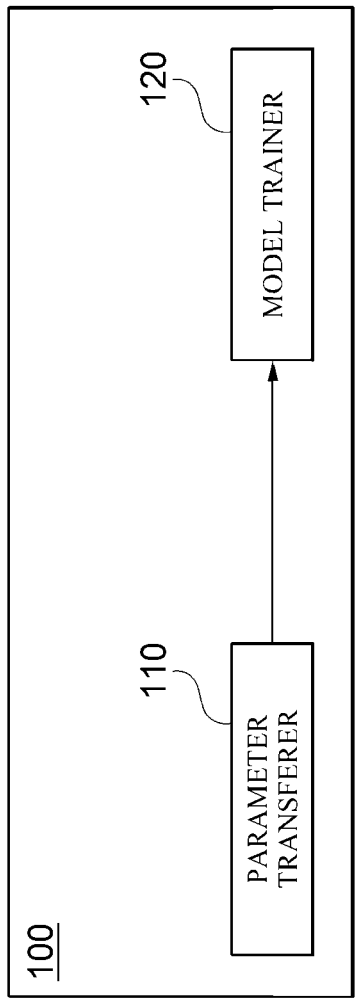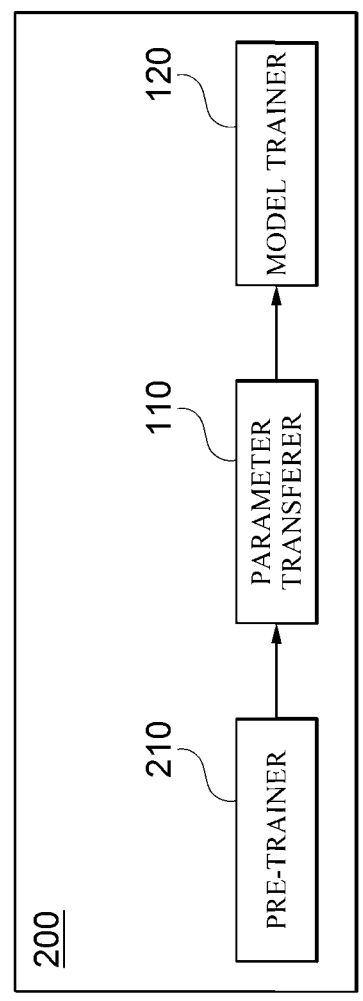

APPARATUS AND METHOD FOR TRAINING DIALOGUE SUMMARY MODEL

CROSS-REFERENCE TO RELATED APPLICATION(S)

This application claims the benefit under 35 USC § 119(a) of Korean Patent Application Nos. 10-2021-0037976, filed on Mar. 24, 2021, and 10-2021-0069043, filed on May 28, 2021, in the Korean Intellectual Property Office, the entire disclosure of which is incorporated herein by reference for all purposes.

BACKGROUND

1. Field

The following description relates to a technology for training a dialogue summary model.

2. Description of Related Art

In the field of natural language generation such as document summary in the related art, an encoder-decoder-based model such as a transformer is mainly studied.

However, the above-mentioned studies focus on formal and large-scale datasets such as news and emails, and accordingly, have a limitation in that they are not suitable for summarizing dialogues between different speakers.

That is, the dialogue dataset has a lot of heterogeneous characteristics compared to datasets such as news and emails, due to the facts that (1) important information is scattered in the utterances of several speakers since the flow of information is not sequential and a form of several speakers exchanging information is taken, (2) pronouns are used in various ways as the name changes whenever the speaker changes, (3) colloquial words, including abbreviations, profanity, and emoticons, are mainly used, and so on, and thus the dialogue dataset is difficult to be applied to the natural language generation model in the related art.

In addition to that, the dialogue dataset is difficult to obtain high-quality data in bulk compared to general plain-text datasets (for example, news or email), and as a consequence, there is a need for a new method that allows a model not only to be optimized for dialogue summary, but also to have high learning efficiency with relatively little training data.

SUMMARY

The disclosed embodiments are intended to provide a means for training a model to be optimized for dialogue summary.

In one general aspect, there is provided an apparatus for training a dialogue summary model according to an embodiment including: a parameter transferer configured to transfer one or more learning parameter values of a pre-trained natural language processing model to a sequence-to-sequence-based dialogue summary model; and a model trainer configured to train the dialogue summary model by using the transferred learning parameter values as initial values for learning parameters of each of an encoder and a decoder in the dialogue summary model.

The natural language processing model may be trained by self-supervised learning based on at least one of a masking speaker task, a switching speaker task, a switching utterance task, and an inserting utterance task.

The masking speaker task may be performed by replacing at least a portion of one or more speaker tokens included in one of a dialogue text and a summary text with a mask token, and the natural language processing model may be pre-trained based on a loss between a predicted result of the natural language processing model on a speaker token corresponding to a position of the mask token and the replaced speaker token.

The switching speaker task may be performed by switching at least a portion of one or more speaker tokens included in the dialogue text, and the natural language processing model may be pre-trained based on a loss between a prediction result of the natural language processing model on whether or not switching has been performed for a speaker token of each of utterances included in the dialogue text and a correct answer indicating whether or not there is actual switching.

The switching utterance task may be performed by switching at least a portion of one or more utterances included in the dialogue text, and the natural language processing model may be pre-trained based on a loss between a prediction result of the natural language processing model on whether or not switching has been performed for each of utterances included in the dialogue text and a correct answer indicating whether or not there is actual switching.

The inserting utterance task may be performed by selecting one or more utterances from at least one dialogue text included in the same batch and inserting the utterances into a dialogue text to be input to the natural language processing model, and the natural language processing model may be pre-trained based on a loss between a prediction result of the natural language processing model on whether or not each of utterances included in the input dialogue text is inserted from another dialogue text and a correct answer indicating whether or not there is actual inserting.

Each of the encoder and the decoder may include at least a portion of a network structure of the natural language processing model.

The model trainer may be further configured to update the learning parameters of the dialogue summary model based on a loss between an inferred summary text output by the dialogue summary model receiving the dialogue text and a correct answer summary text corresponding to the input dialogue text.

The model trainer may be further configured to share at least some of learning parameter values of the encoder and at least some of learning parameter values of the decoder.

In another general aspect, there is provided a method for training a dialogue summary model according to an embodiment including: transferring one or more learning parameter values of a pre-trained natural language processing model to a sequence-to-sequence-based dialogue summary model; and training the dialogue summary model by using the transferred learning parameter values as initial values for learning parameters of each of an encoder and a decoder in the dialogue summary model.

The natural language processing model may be trained by self-supervised learning based on at least one of a masking speaker task, a switching speaker task, a switching utterance task, and an inserting utterance task.

The masking speaker task may be performed by replacing at least a portion of one or more speaker tokens included in one of a dialogue text and a summary text with a mask token, and the natural language processing model may be pre-trained based on a loss between a predicted result of the natural language processing model on a speaker token corresponding to a position of the mask token and the replaced speaker token.

The switching speaker task may be performed by switching at least a portion of one or more speaker tokens included in the dialogue text, and the natural language processing model may be pre-trained based on a loss between a prediction result of the natural language processing model on whether or not switching is performed for a speaker token of each of utterances included in the dialogue text and a correct answer indicating whether or not there is actual switching.

The switching utterance task may be performed by switching at least a portion of one or more utterances included in the dialogue text, and the natural language processing model may be pre-trained based on a loss between a prediction result of the natural language processing model on whether or not switching has been performed for each of utterances included in the dialogue text and a correct answer indicating whether or not there is actual switching.

The inserting utterance task may be performed by selecting one or more utterances from at least one dialogue text included in the same batch and inserting the utterances into a dialogue text to be input to the natural language processing model, and the natural language processing model may be pre-trained based on a loss between a prediction result of the natural language processing model on whether or not each of utterances included in the input dialogue text is inserted from another dialogue text and a correct answer indicating whether or not there is actual inserting.

Each of the encoder and the decoder may include at least a portion of a network structure of the natural language processing model.

The training may comprise updating the learning parameters of the dialogue summary model based on a loss between an inferred summary text output by the dialogue summary model receiving the dialogue text and a correct answer summary text corresponding to the input dialogue text.

The training may comprise sharing at least some of learning parameter values of the encoder and at least some of learning parameter values of the decoder.

BRIEF DESCRIPTION OF THE DRAWINGS

FIG. 1 is a block diagram for illustrating an apparatus for training a dialogue summary model according to an embodiment.

FIG. 2 is a block diagram for illustrating an apparatus for training a dialogue summary model according to an additional embodiment.

DETAILED DESCRIPTION

Figure 3:
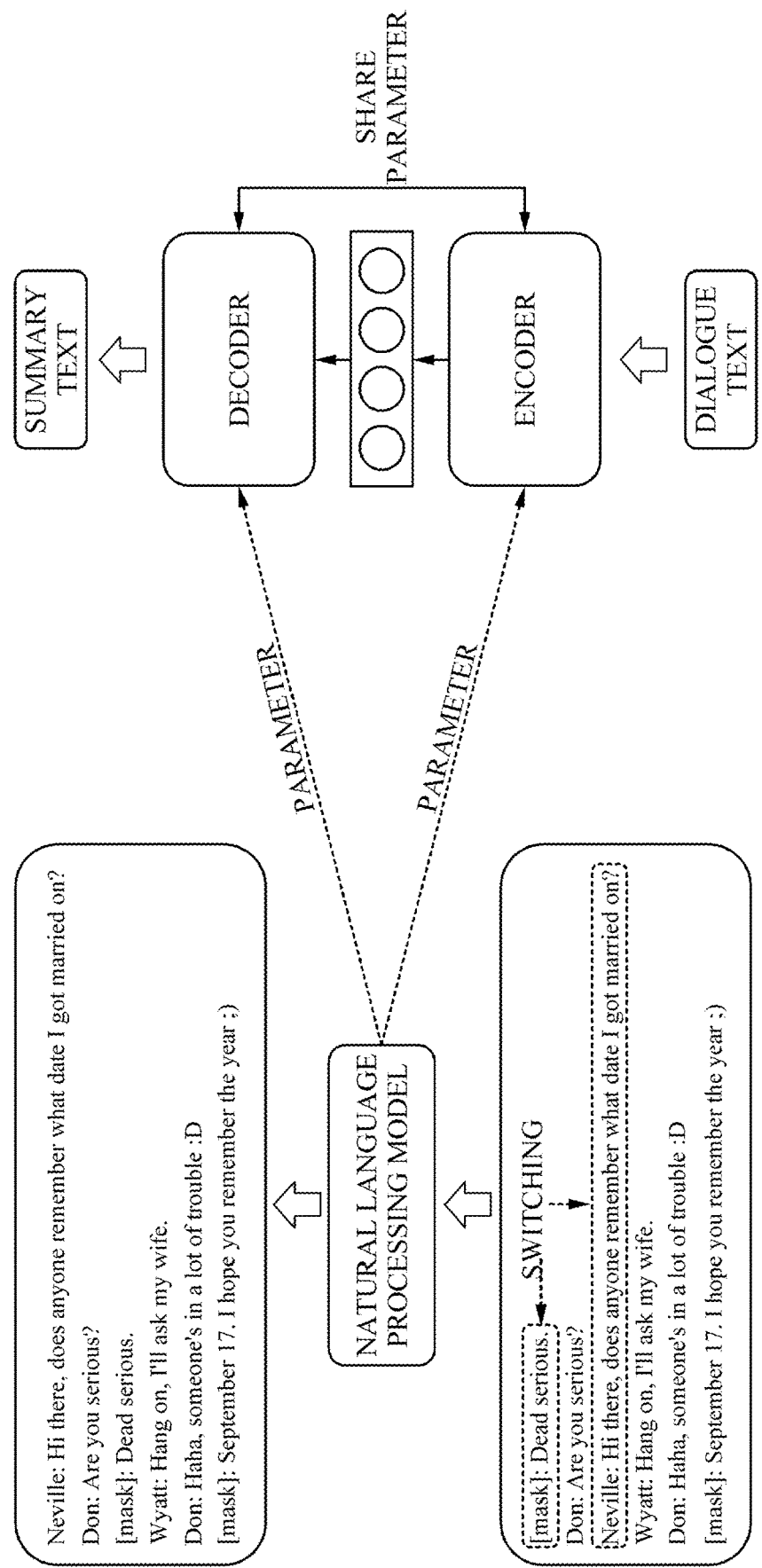
FIG. 3 is a diagram for schematically illustrating an overall architecture for training a dialogue summary model.

Hereinafter, specific embodiments will be described with reference to the accompanying drawings. The following detailed description is provided to assist in a comprehensive understanding of the methods, devices and/or systems described herein. However, the detailed description is only for illustrative purposes and the disclosed embodiments are not limited thereto.

In describing the embodiments, when it is determined that detailed descriptions of related known technology may unnecessarily obscure the gist of the disclosed embodiments, the detailed descriptions thereof will be omitted. The terms used below are defined in consideration of functions in the disclosed embodiments, but may be changed depending on the customary practice or the intention of a user or operator. Thus, the definitions should be determined based on the overall content of the present specification. The terms used herein are only for describing the embodiments, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

In the following description, the terminology "transmission", "communication", "reception" of a signal or information and terminology similar thereto may include a meaning in which the signal or information is directly transmitted from one element to another element and transmitted from one element to another element through an intervening element.

In particular, "transmission" of the signal or information to one element may indicate a final destination of the signal or information and may not imply a direct destination. The same is true for "reception" of the signal or information. In addition, in the present specification, a meaning in which two or more pieces of data or information are "related" indicates that when any one piece of data (or information) is obtained, at least a portion of other data (or information) may be obtained based thereon.

Further, it will be understood that, although the terms first, second, etc. may be used herein to describe various elements, these elements should not be limited by these terms. These terms may be used to distinguish one element from another element.

For example, without departing from the scope of the present disclosure, a first element could be termed a second element, and similarly, a second element could be termed a first element.

FIG. 1 is a block diagram for illustrating an apparatus 100 for training a dialogue summary model according to an embodiment.

As illustrated, the apparatus 100 for training the dialogue summary model (dialogue summary model) according to an embodiment includes a parameter transferer 110 and a model trainer 120.

In the illustrated embodiment, each component may have different functions and capabilities in addition to those described below, and additional components may be included in addition to those described below.

In addition, in an embodiment, the parameter transferer 110 and the model trainer 120 may be implemented by using one or more physically separated devices, or may be implemented by one or more processors or a combination of one or more processors and software, and may not be clearly distinguished in specific operations, unlike the illustrated example.

The parameter transferer 110 transfers one or more learning parameter values of a pre-trained natural language processing model to a sequence-to-sequence-based dialogue summary model.

Specifically, the natural language processing model may include a deep neural network-based structure.

According to an embodiment, the natural language processing model may include a deep neural network to which an attention mechanism is applied. For example, the natural language processing model may include a deep neural network based on a transformer or a deep neural network based on bidirectional encoder representations from transformers (BERT) including a plurality of transformer-based encoder structures.

More specifically, the natural language processing model may include an encoder including a deep neural network based on a transformer or BERT, and prediction heads that perform prediction on input data. In this case, the prediction head may include one or more linear layers.

According to another embodiment, the natural language processing model may include a deep neural network based on a recurrent neural network (RNN). For example, the natural language processing model may include a deep neural network based on long short-term memory (LSTM) or gated recurrent units (GRU).

More specifically, a natural language processing model may include an encoder including a deep neural network based on LSTM or GRU and prediction heads that perform prediction on input data. In this case, the prediction head may include one or more linear layers.

According to an embodiment, the natural language processing model may be trained by self-supervised learning based on at least one of the following tasks (1) to (4).

(1) Masking speaker task
(2) Switching speaker task
(3) Switching utterance task
(4) Inserting utterance task Specifically, the masking speaker task may be performed by replacing at least a portion of one or more speaker tokens included in any one of a dialogue text and a summary text with a mask token. In this case, the natural language processing model may be pre-trained based on the loss between a prediction result of the natural language processing model on a speaker token corresponding to the position of a mask token and the replaced speaker token. A detailed description thereof will be given below with reference to FIG. 7.

Meanwhile, specifically, the switching speaker task may be performed by switching at least a portion of one or more speaker tokens included in the dialogue text. In this case, the natural language processing model may be pre-trained based on a loss between a prediction result of the natural language processing model on whether or not switching has been performed for a speaker token of each of utterances included in the dialogue text and a correct answer indicating whether or not there is actual switching. A detailed description thereof will be given below with reference to FIG. 8.

Meanwhile, specifically, the switching utterance task may be performed by switching at least a portion of one or more utterances included in the dialogue text. In this case, the natural language processing model may be pre-trained based on a loss between a prediction result of the natural language processing model on whether or not switching has been performed for each of utterances included in the dialogue text and a correct answer indicating whether or not there is actual switching. A detailed description thereof will be given below with reference to FIG. 9.

Meanwhile, specifically, the inserting utterance task may be performed by selecting one or more utterances from at least one dialogue text included in the same batch and inserting the utterances into a dialogue text to be input to the natural language processing model. In this case, the natural language processing model may be pre-trained based on a loss between a prediction result of the natural language processing model on whether or not each of utterances included in the input dialogue text is inserted from another dialogue text and a correct answer indicating whether or not there is actual inserting. A detailed description thereof will be given below with reference to FIG. 10.

In addition, according to an embodiment, the dialogue summary model may include a sequence-to-sequence-based deep neural network composed of the encoder and the decoder, and may receive a dialogue text by the encoder and output a summary text of the dialogue text through the decoder.

The model trainer 120 trains the dialogue summary model by using the transferred learning parameter values as initial values for the learning parameters of each of the encoder and the decoder in the dialogue summary model.

According to an embodiment, each of the encoder and the decoder included in the dialogue summary model may include at least a portion of a network structure of the natural language processing model.

For example, the encoder of the dialogue summary model may have the same network structure as the natural language processing model, and the decoder of the dialogue summary model may additionally include a layer for converting an embedding vector into a summary text in the network structure of the natural language processing model.

As a more detailed example, when the natural language processing model includes a BERT-based deep neural network, each of the encoder and the decoder of the dialogue summary model may also include the BERT-based deep neural network included in the natural language processing model.

Meanwhile, according to an embodiment, the training data including the utterance text and the summary text used for training the dialogue summary model may be data included in the same dataset as the training data used for the pre-training of the natural language processing model, but is not necessarily limited thereto. That is, according to an embodiment, the training data of the dialogue summary model and the training data of the natural language processing model may be data included in separate datasets, respectively.

Meanwhile, according to an embodiment, the model trainer 120 may update the learning parameters of the dialogue summary model based on the loss between an inferred summary text output by the dialogue summary model receiving the dialogue text and a correct answer summary text corresponding to the dialogue text input to the dialogue summary model.

In addition, according to an embodiment, the model trainer 120 may share at least some of learning parameter values of the encoder included in the dialogue summary model and at least some of the learning parameter values of the decoder included in the dialogue summary model.

FIG. 2 is a block diagram for illustrating an apparatus 200 for training a dialogue summary model according to an additional embodiment.

As illustrated, the apparatus 200 for training the dialogue summary model according to the additional embodiment further includes a pre-trainer 210, in addition to the parameter transferer 110 and the model trainer 120. In this case, the parameter transferer 110 and the model trainer 120 perform the same or similar functions as in the embodiment described with reference to FIG. 1, and thus the description thereof will not be repeated.

In the illustrated embodiment, each component may have different functions and capabilities in addition to those described below, and additional components may be included in addition to those described below.

In addition, in an embodiment, the parameter transferer 110, the model trainer 120, and the pre-trainer 210 may be implemented by using one or more physically separated devices, or may be implemented by one or more processors or a combination of one or more processors and software, and may not be clearly distinguished in specific operations, unlike the illustrated example.

The pre-trainer 210 may perform pre-training of the natural language processing model described above with reference to FIG. 1.

That is, according to an embodiment, the pre-trainer 210 may train the natural language processing model by self-supervised learning based on the above-described masking speaker task, switching speaker task, switching utterance task, and inserting utterance task, and the like, prior to transferring the learning parameter values of the natural language processing model to the dialogue summary model in the parameter transferer 110.

Specifically, the pre-trainer 210 may pre-processes the dialogue text dataset or summary text dataset used for pre-training the natural language processing model in a form suitable for a pre-training algorithm (for example, self-supervised learning to which the masking speaker task is applied), apply the pre-training algorithm to the pre-processed dataset, and update the learning parameters of the natural language processing model by training the natural language processing model using the dataset to which the pre-training algorithm is applied.

FIG. 3 is a diagram 300 for schematically illustrating an overall architecture for training the dialogue summary model.

Referring to FIG. 3, the natural language processing model that has been pre-trained through self-supervised learning is shown on the left, and the dialogue summary model that performs an abstractive summary on a dialogue text and outputs a summary text is shown on the right.

First, the natural language processing model on the left receives a lower dialogue text where the switching utterance task has been performed, and outputs an upper dialogue text.

Upon closer examination, in the lower dialogue text, the two utterances that are boxed with dotted lines are "[mask]: Dead serious." and "Neville: Hi there, does anyone remember what date I got married on?" are switched between each other. The illustrated natural language processing model receives the dialogue text and predicts the original order of the two switched sentences (refer to the upper dialogue text).

In addition, Neville, who utters "Dead serious.", is masked on the lower dialogue text, and Wyatt who utters "September 17. I hope you remember the year;)" is also masked. Although it is not indicated who each masked speaker is on the upper dialogue text, the natural language processing model may additionally predict who the masked speaker is by the self-supervised learning technique.

By performing the self-supervised learning shown on the left, the natural language processing model updates the learning parameter values. Although FIG. 3 shows only one dialogue text to be used for self-supervised learning of the natural language processing model, this is for convenience of description, and a plurality of dialogue text datasets may be used for training the natural language processing model, and a plurality of summary text datasets may also be additionally used according to embodiments.

Meanwhile, when it is determined that the semantic understanding ability of the natural language processing model is improved over a preset level through self-supervised learning, the learning parameter values of the natural language processing model may be transferred to the encoder and the decoder of the dialogue summary model shown on the right, respectively. In this case, the semantic understanding ability of the natural language processing model may be quantified to the prediction accuracy of the natural language processing model for the input dialogue text dataset or summary text dataset. However, a criterion for determining whether or not the natural language processing model transfers the learning parameter values may be set in various ways in addition to the above-mentioned semantic understanding ability, for example, whether or not the learning parameter values are transferred may be determined based on an epoch value for self-supervised learning of the natural language processing model, a cumulative time for self-supervised learning, or the like.

As illustrated in FIG. 3, the encoder of the dialogue summary model may take the dialogue text as input and output an embedding vector (shown as a rectangular box containing a circle), and the decoder may take the embedding vector output from the encoder as input and output a summary text.

In this case, the encoder and the decoder of the dialogue summary model also have a deep neural network structure, and thus there are learning parameters to be learned. In this regard, learning parameter values transferred from the natural language processing model is set to initial values of the learning parameters of each of the encoder and the decoder.

Then, the dialogue summary model is trained to have high abstract summarization performance using a dataset consisting of the dialogue text and the matching summary text, where at least some of the learning parameter values of the encoder and at least some of the learning parameter values of the decoder may be shared with each other. For example, among weight parameter values of the encoder and weight parameter values of the decoder, all weight parameter values except for a weight parameter value of a cross attention layer may be shared with each other.

With this architecture, the dialogue summary model does not need to set the learning parameter values of the encoders and the decoders to random values at the beginning of training, and thus the time and cost for training may be drastically reduced.

In addition, self-supervised learning is previously performed using the dialogue text in the natural language processing model, and thus the learning parameter values of the natural language processing model learned in this way reflect the unique characteristics of dialogue texts that are different from plain texts such as news or emails. Since the dialogue summary model is re-trained based on these learning parameter values, there is also an advantage that it may be optimized for dialogue summary.

In addition, since the natural language processing model is trained based on self-supervised learning that is possible even with a small amount of unlabeled data, not supervised learning that requires a large amount of labeled data, it is also easy to overcome the problem with the dialogue text-summary text dataset with few standardized high-quality data.

Figure 4:
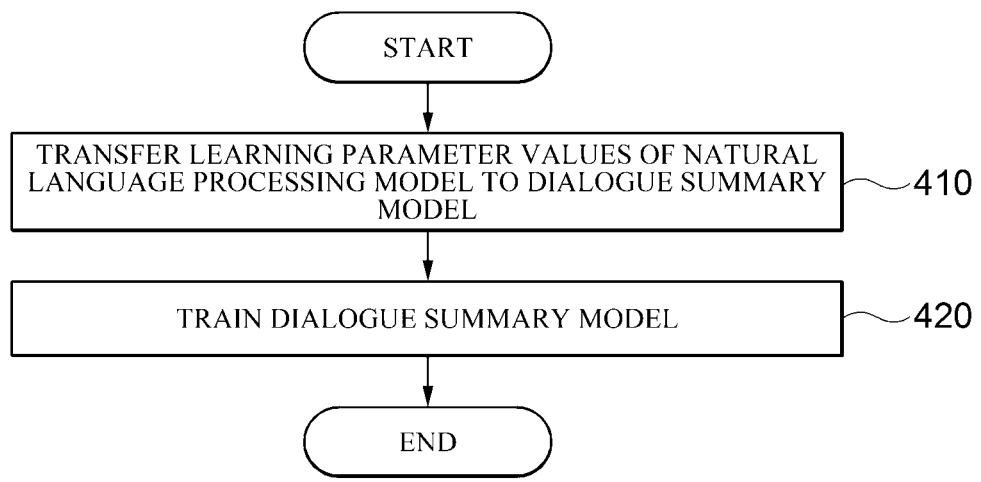
FIG. 4 is a flowchart for describing a method for training a dialogue summary model according to an embodiment.

FIG. 4 is a flowchart for describing a method for training a dialogue summary model according to an embodiment.

The method illustrated in FIG. 4 may be performed, for example, by the apparatus 100 for training the dialogue summary model described above.

First, the apparatus 100 for training the dialogue summary model transfers one or more learning parameter values of the pre-trained deep neural network-based natural language processing model to the sequence-to-sequence-based dialogue summary model (410).

Then, the apparatus 100 for training the dialogue summary model trains the dialogue summary model by using the transferred one or more learning parameter values as initial values for the learning parameters of each of the encoder and the decoder in the dialogue summary model (420).

Figure 5:
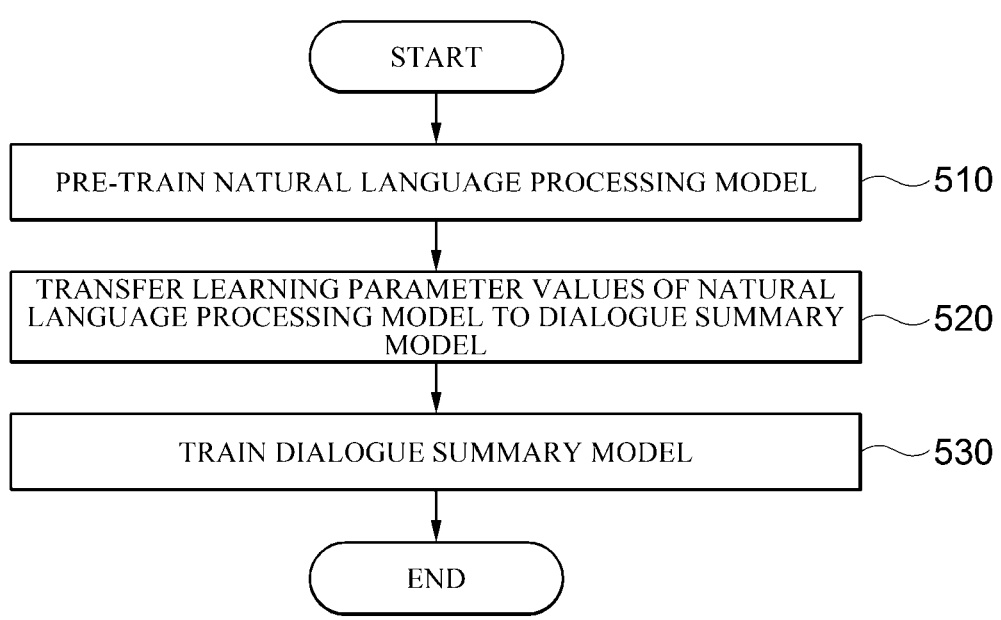
FIG. 5 is a flowchart for describing a method for training a dialogue summary model according to an additional embodiment.

FIG. 5 is a flowchart for describing a method for training a dialogue summary model according to an additional embodiment.

The method illustrated in FIG. 5 may be performed, for example, by the apparatus 200 for training the dialogue summary model described above.

First, the apparatus 200 for training the dialogue summary model pre-trains the natural language processing model based on at least one of the masking speaker task, the switching speaker task, the switching utterance task, and the inserting utterance task (510).

Then, the apparatus 200 for training the dialogue summary model transfers one or more learning parameter values of the pre-trained deep neural network-based natural language processing model to the sequence-to-sequence-based dialogue summary model (520).

Then, the apparatus 200 for training the dialogue summary model trains the dialogue summary model by using the one or more transferred learning parameter values as initial values for the learning parameters of each of the encoder and the decoder in the dialogue summary model (530).

Figure 6:
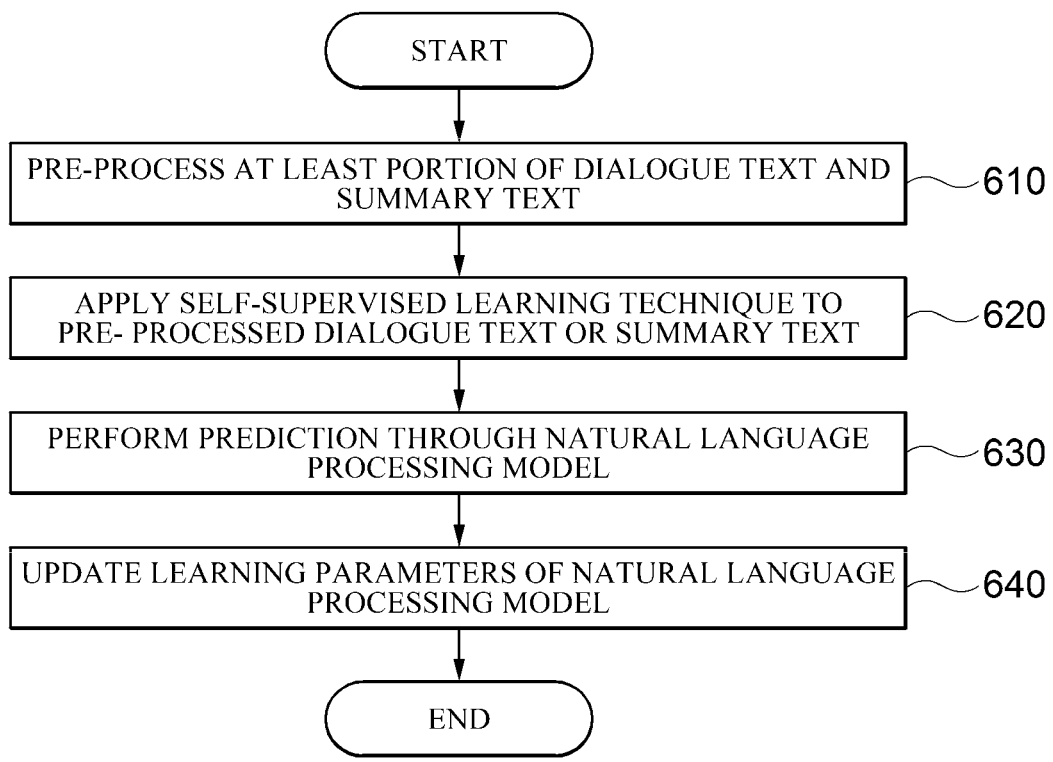
FIG. 6 is a flowchart for describing step 510 in detail.

FIG. 6 is a flowchart for describing step 510 in detail.

The method illustrated in FIG. 6 may be performed, for example, by the apparatus 200 for training the dialogue summary model described above.

However, this is exemplary, and according to embodiments, step 510 may be performed in advance in a computing device separate from the apparatus 100 or 200 for training the dialogue summary model, and the user may import the pre-trained natural language processing model from an external server or pre-train the natural language processing model by using a computing device separate from the apparatus 100 or 200 for training the dialogue summary model. This also applies to the following FIGS. 7 to 10. However, hereinafter, for convenience of description, it is assumed that the entity performing the method shown in FIGS. 6 to 10 is the apparatus 200 for training the dialogue summary model.

First, the apparatus 200 for training the dialogue summary model pre-processes at least a portion of the dialogue text and the summary text to be used for training the natural language processing model (610).

Then, the apparatus 200 for training the dialogue summary model applies the self-supervised learning technique to the pre-processed dialogue text or summary text (620).

Then, the apparatus 200 for training the dialogue summary model performs prediction through the natural language processing model using the dialogue text or summary text (or both dialogue text and summary text) to which self-supervised learning techniques are applied as inputs to the natural language processing model (630).

Then, the apparatus 200 for training the dialogue summary model updates the learning parameters of the natural language processing model based on the loss between a prediction result of the natural language processing model and a correct answer (640).

Figure 7:
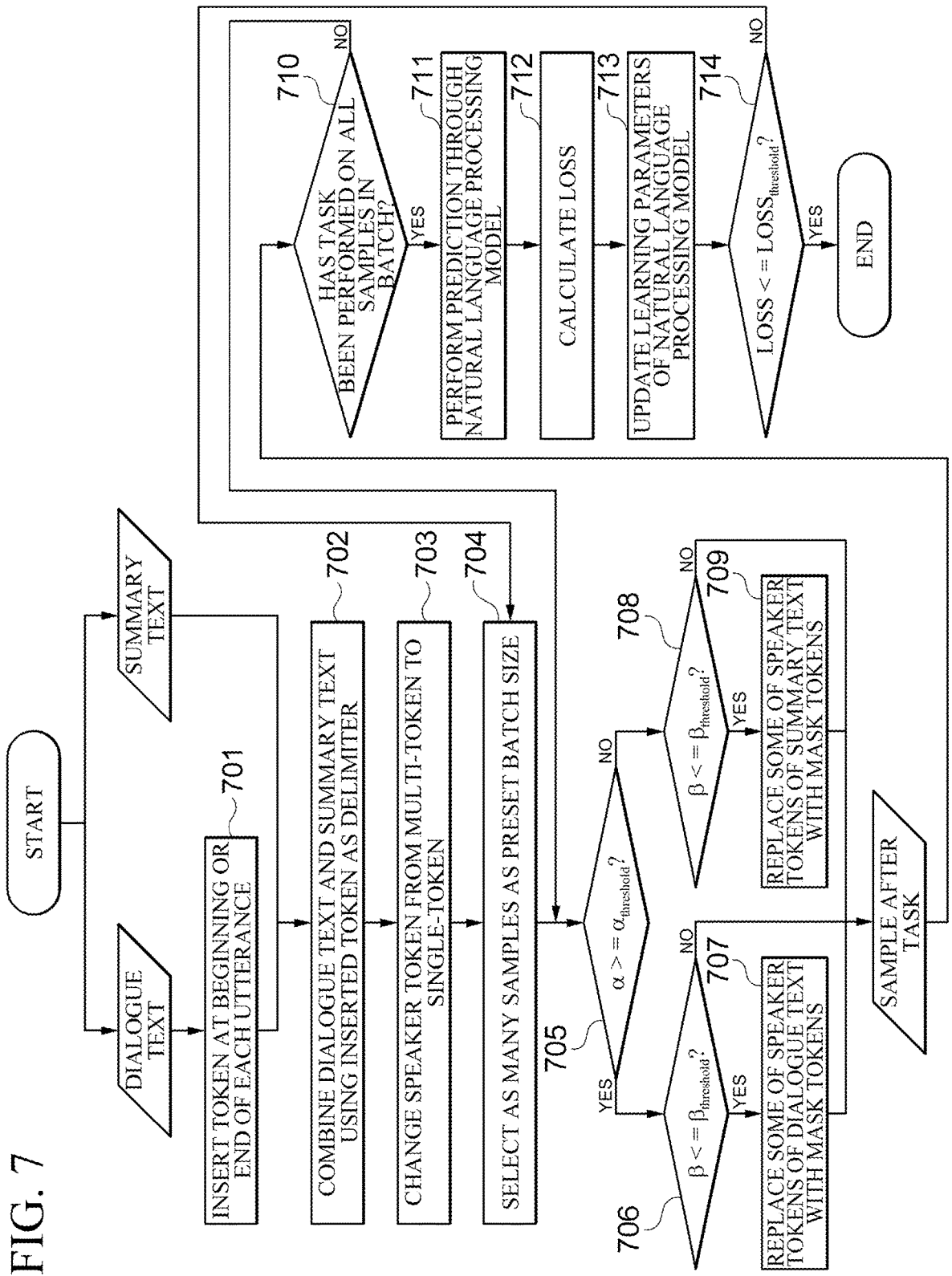
FIG. 7 is a flowchart for describing a method for pre-training a natural language processing model based on a masking speaker task according to an embodiment.

FIG. 7 is a flowchart for describing a method for pre-training a natural language processing model based on a masking speaker task according to an embodiment.

The method illustrated in FIG. 7 may be performed, for example, by the apparatus 200 for training the dialogue summary model described above.

First, the apparatus 200 for training the dialogue summary model inserts a token at the beginning or end of each of utterances constituting a dialogue text to identify the beginning or end of the utterance (701).

According to an embodiment, the apparatus 200 for training the dialogue summary model may insert a begin of sentence (BOS) token at the beginning of each of the utterances constituting the dialogue text.

According to another embodiment, the apparatus 200 for training the dialogue summary model may insert an end of sentence (EOS) token at the end of each of the utterances constituting the dialogue text.

The above embodiments related to the insertion of the token may be similarly applied to a pre-training method, which will be described below with reference to FIGS. 8 to 10.

Then, the apparatus 200 for training the dialogue summary model combines the dialogue text and the summary text using the inserted token as a delimiter (702).

According to an embodiment, the apparatus 200 for training the dialogue summary model may concatenate the dialogue text and the summary text.

Furthermore, according to an embodiment, the apparatus 200 for training the dialogue summary model may additionally insert a BOS token or an EOS token between the dialogue text and the summary text to distinguish the dialogue text from the summary text.

In addition, according to an embodiment, the combination of the dialogue text and the summary text may be performed in a predefined order. That is, the combined dialogue text-summary text pair may be formalized in a format in which the dialogue text is placed first and the summary text is placed later, or the summary text is placed first and the dialogue text is placed later.

The above embodiments related to the combination of the dialogue text and the summary text may be similarly applied to the pre-training method, which will be described below with reference to FIGS. 8 to 10.

Then, the apparatus 200 for training the dialogue summary model changes a speaker token of each of all speakers appearing in the combined dialogue text and summary text from a multi-token to a single-token (703).

For example, let's suppose that the speaker of any one utterance in the dialogue text is Anney, and the speaker token corresponding to Anney is a multi-token composed of 'Ann' and 'ney'. In this case, the apparatus 200 for training the dialogue summary model may change the speaker token corresponding to Anney to the single-token 'Ann'.

Through this, the apparatus 200 for training the dialogue summary model may prevent the natural language processing model from being excessively trained depending on the spelling or vocabulary of the speaker, and may allow the natural language processing model to be trained by focusing more on the relationship between the speaker and the utterance.

The above embodiments related to the change to the single-token may be similarly applied to a pre-training method, which will be described below with reference to FIGS. 8 to 10.

Then, the apparatus 200 for training the dialogue summary model selects, as samples, as many dialogue text-summary text pairs as a preset batch size, among a plurality of dialogue text-summary text pairs (704). For example, when the batch size is 128 and the size of the training dataset is larger than the batch size, the apparatus 200 for training the dialogue summary model may select just 128 dialogue text-summary text pairs from the training dataset as samples.

According to an embodiment, the apparatus 200 for training the dialogue summary model may randomly select as many samples as the batch size, or may select samples according to a preset criterion or order. However, it is to be noted that the apparatus 200 for training the dialogue summary model may select samples through various methods other than the above-described method.

Then, the apparatus 200 for training the dialogue summary model compares a probability value of a variable $\alpha$, which is arbitrarily determined among rational numbers 0 or more and 1 or less for each sample, with a preset threshold $\alpha_{threshold}$, and determines an execution target of the masking speaker task from among the dialogue text and the summary text (705). That is, when the probability value of a is equal to or greater than $\alpha_{threshold}$, the dialogue text is determined as the execution target of the masking speaker task, and when the probability value of $\alpha$ is less than $\alpha_{threshold}$, the summary text is determined as the target of the masking speaker task.

For example, when the probability value of $\alpha$ is equal to or greater than $\alpha_{threshold}$, "Amanda: I baked cookies. Do you want some?", which is the execution target of the masking speaker task among utterances of the dialogue text, may be "[mask]: I baked cookies. Do you want some?".

As another example, when the probability value of $\alpha$ is less than $\alpha_{threshold}$, "Amanda baked cookies and will bring Jerry some tomorrow.", which is the execution target of the masking speaker task among utterances of the summary text, may be "[mask] baked cookies and will bring [mask] some tomorrow."

According to an embodiment, the apparatus 200 for training the dialogue summary model may identify the speaker in the dialogue text based on a standardized structure of the dialogue text (e.g., a structure combined in the order of the speaker, the colon, and the utterance contents), and identify the speaker in the summary text based on information on the speaker identified in the dialogue text.

Then, the apparatus 200 for training the dialogue summary model compares a probability value of a variable $\beta$, which is randomly determined among rational numbers 0 or more and 1 or less for each utterance or summary text, with a preset threshold $\beta_{threshold}$, and determines whether to replace each speaker token of the dialogue text or summary text with a mask token (706, 708).

In this case, $\beta_{threshold}$ is a value for adjusting the probability that the speaker token is replaced with the mask token, where, as $\beta_{threshold}$ increases, the speaker token is more likely to be replaced with the mask token, which may result in the increase in difficulty of pre-training of the natural language processing model.

Then, the apparatus 200 for training the dialogue summary model replaces the speaker token, which is the determination target, with the mask token when the probability value of $\beta$ is less than or equal to $\beta_{threshold}$ (707, 709), and does not replace the speaker token, which is the determination target, with the mask token when the probability value of $\beta$ is greater than the $\beta_{threshold}$, thereby generating a sample on which the masking speaker task is further performed.

Then, the apparatus 200 for training the dialogue summary model determines whether the masking speaker task through steps 705 to 709 has been performed on all the samples selected in step 704 (710).

Then, when the masking speaker task has been performed on all the selected samples, the apparatus 200 for training the dialogue summary model performs prediction on the masked speaker token by inputting, into the natural language processing model, the samples on which the masking speaker task has been performed (711), and when there is a sample on which the masking speaker task has not been performed among the selected samples, performs steps 705 to 709 on the corresponding sample.

Then, the apparatus 200 for training the dialogue summary model calculates a loss between a prediction result of the natural language processing model for a speaker token corresponding to the position of the mask token and the replaced speaker token (712).

According to an embodiment, the apparatus 200 for training the dialogue summary model may calculate a cross-entropy loss based on the prediction result of the natural language processing model and the replaced speaker token. However, this is exemplary, and it is obvious that various types of losses may be calculated through other loss functions in addition to the cross entropy loss, according to embodiments.

The above embodiment related to the loss may be similarly applied to the pre-training method, which will be described below with reference to FIGS. 8 to 10.

Then, the apparatus 200 for training the dialogue summary model updates the learning parameters of the natural language processing model based on the calculated loss (713).

Then, the apparatus 200 for training the dialogue summary model compares the calculated loss with a preset loss threshold $loss_{threshold}$, ends the pre-training of the natural language processing model when the loss is less than or equal to the loss threshold, and newly selects as many samples as a batch size preset through step 704 and repeats subsequent operations when the loss exceeds the loss threshold (714).

Figure 8:
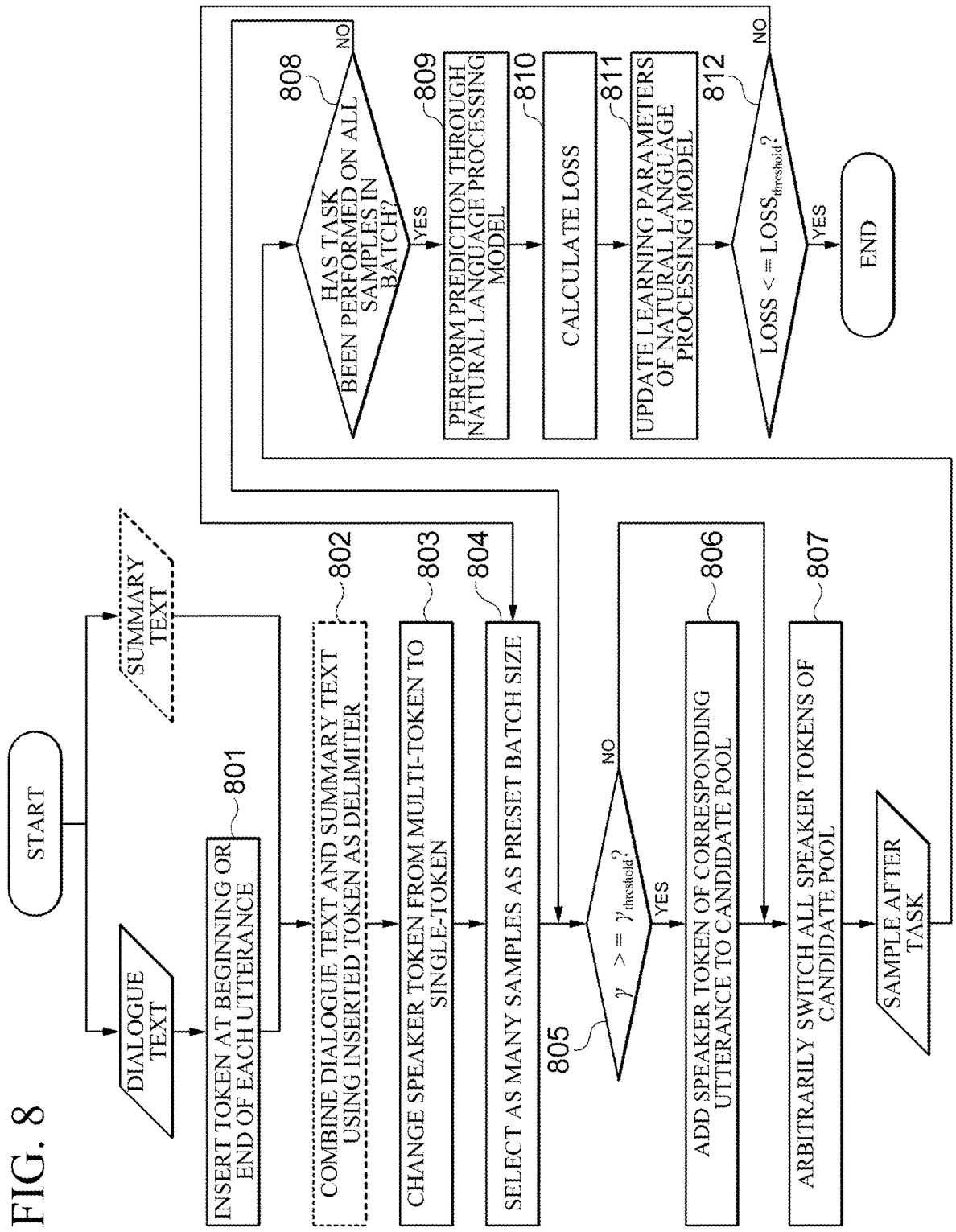
FIG. 8 is a flowchart for describing a method for pre-training a natural language processing model based on a switching speaker task according to an embodiment.

FIG. 8 is a flowchart for describing a method for pre-training a natural language processing model based on a switching speaker task according to an embodiment.

The method illustrated in FIG. 8 may be performed, for example, by the apparatus 200 for training the dialogue summary model described above.

Data shown by a dotted line in FIG. 8 indicates that input or output may be omitted, and an operation (steps) shown by a dotted line indicates that the corresponding step may be omitted. The indications have the same meaning in FIGS. 9 and 10, and a detailed description related thereto will be described later.

First, the apparatus 200 for training the dialogue summary model inserts a token at the beginning or end of each of utterances constituting a dialogue text to identify the beginning or end of the utterance (801).

Then, the apparatus 200 for training the dialogue summary model combines the dialogue text and the summary text using the inserted token as a delimiter (802). However, in the embodiment described with reference to FIG. 8, the use of the summary text is optional, and the switching speaker task may be performed only for the dialogue text. In this case, step 802 may be omitted.

Then, the apparatus 200 for training the dialogue summary model changes a speaker token of each of all speakers appearing in the combined dialogue text and summary text from a multi-token to a single-token (803). However, when the summary text is not used, the apparatus 200 for training the dialogue summary model changes only the speaker token of each of all speakers appearing in the dialogue text from the multi-token to the single-token.

Then, the apparatus 200 for training the dialogue summary model selects, as samples, as many dialogue text-summary text pairs as a preset batch size, among a plurality of dialogue text-summary text pairs (804). However, when the summary text is not used, the apparatus 200 for training the dialogue summary model selects, as samples, as many dialogue text as the batch size from among a plurality of dialogue texts.

Then, the apparatus 200 for training the dialogue summary model compares a probability value of a variable $\gamma$, which is arbitrarily determined among rational numbers 0 or more and 1 or less for each utterance in each sample, with a preset threshold $\gamma_{threshold}$, and determines whether to perform switching for the speaker token for each utterance (805).

Then, the apparatus 200 for training the dialogue summary model adds the speaker token of the corresponding utterance to a candidate pool related to switching speaker when the probability value of $\gamma$ is equal to or greater than $\gamma_{threshold}$ (806), and does not add the speaker token of the corresponding utterance to the above-mentioned candidate pool when the probability value of $\gamma$ is less than or equal to $\gamma_{threshold}$.

Then, the apparatus 200 for training the dialogue summary model arbitrarily switches all speaker tokens added to the above-mentioned candidate pool, thereby generating a sample on which the switching speaker task is performed (807). Since the switching for the speaker tokens in the candidate pool is performed arbitrarily, some speaker tokens may remain in their original positions without being switched.

Then, the apparatus 200 for training the dialogue summary model determines whether the switching speaker task through steps 805 to 807 has been performed on all the samples selected in step 804 (808).

Then, when the switching speaker task has been performed on all the selected samples, the apparatus 200 for training the dialogue summary model performs prediction on whether or not switching has been performed for each speaker token by inputting, into the natural language processing model, the samples on which the switching speaker task has been performed (809), and when there is a sample on which the switching speaker task has not been performed among the selected samples, performs steps 805 to 807 on the corresponding sample.

According to an embodiment, when the natural language processing model performs prediction, the apparatus 200 for training the dialogue summary model may apply a drop-out technique to at least some among one or more linear layers included in the natural language processing model.

The above embodiment related to the drop-out technique may be similarly applied to the pre-training method, which will be described below with reference to FIGS. 9 and 10.

Then, the apparatus 200 for training the dialogue summary model calculates a loss between a prediction result of the natural language processing model on whether or not switching has been performed for each of the speaker tokens and a correct answer indicating whether or not there is actual switching (810).

According to an embodiment, the apparatus 200 for training the dialogue summary model may calculate the loss through any one of the following three methods.

Figure 9:
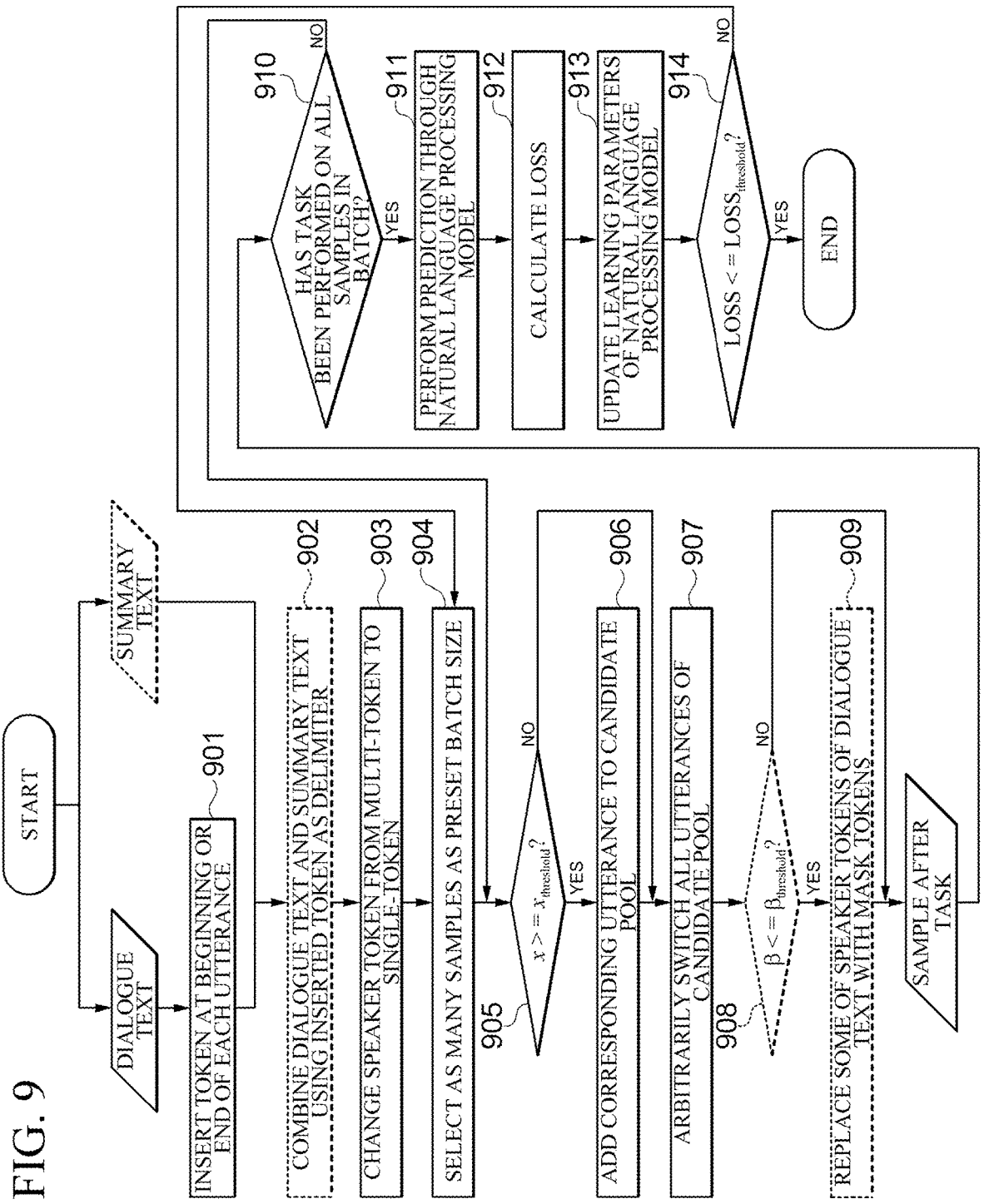
FIG. 9 is a flowchart for describing a method for pre-training a natural language processing model based on a switching utterance task according to an embodiment.
Figure 10:
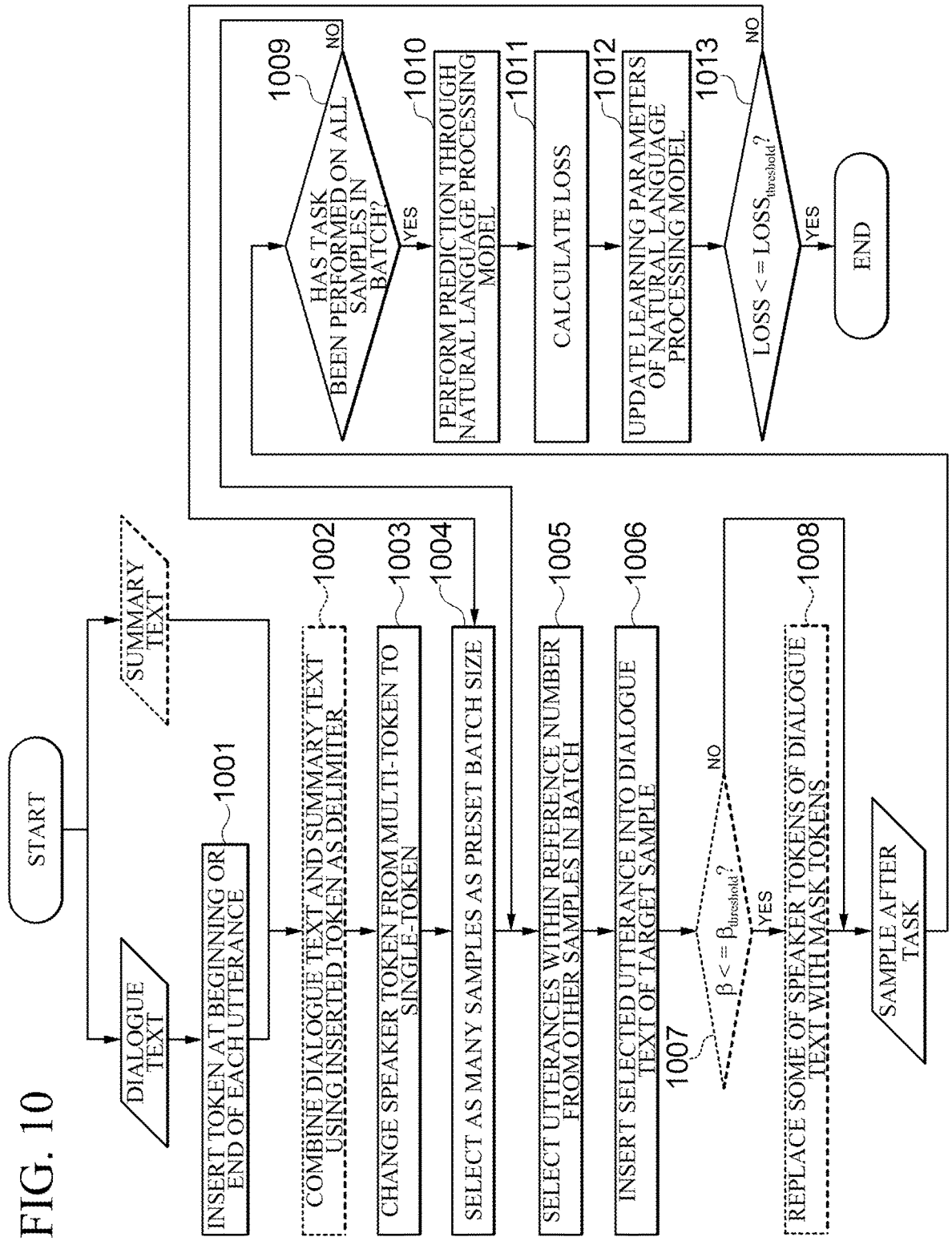
FIG. 10 is a flowchart for describing a method for pre-training a natural language processing model based on an inserting utterance task according to an embodiment.

(1) BOS token method: when a BOS token is inserted at the beginning of every utterance, a prediction result is obtained based on the output of the natural language processing model for the BOS token, and a loss between the prediction result and the correct answer is calculated (2) EOS token method: when a EOS token is inserted at the end of every utterance, a prediction result is obtained based on the output of the natural language processing model for the EOS token, and a loss between the prediction result and the correct answer is calculated (3) Average pooling method: a prediction result is obtained based on an average pooled vector of the final hidden-state of all tokens making up every utterance, and a loss between the prediction result and the correct answer is calculated The above embodiment related to the BOS token method, EOS token method, and average pooling method may be similarly applied to the pre-training method, which will be described below with reference to FIGS. 9 and 10.

Then, the apparatus 200 for training the dialogue summary model updates the learning parameters of the natural language processing model based on the calculated loss (811).

Then, the apparatus 200 for training the dialogue summary model compares the calculated loss with a preset loss threshold $loss_{threshold}$, ends the pre-training of the natural language processing model when the loss is less than or equal to the loss threshold, and newly selects as many samples as a batch size preset through step 804 and repeats subsequent operations when the loss exceeds the loss threshold (812).

FIG. 9 is a flowchart for describing a method for pre-training a natural language processing model based on a switching utterance task according to an embodiment.

The method illustrated in FIG. 9 may be performed, for example, by the apparatus 200 for training the dialogue summary model described above.

First, the apparatus 200 for training the dialogue summary model inserts a token at the beginning or end of each of utterances constituting a dialogue text to identify the beginning or end of the utterance (901).

Then, the apparatus 200 for training the dialogue summary model combines the dialogue text and the summary text using the inserted token as a delimiter (902). However, in the embodiment described with reference to FIG. 9, the use of the summary text is optional, and the switching utterance task may be performed only for the dialogue text. In this case, step 902 may be omitted.

Then, the apparatus 200 for training the dialogue summary model changes a speaker token of each of all speakers appearing in the combined dialogue text and summary text from a multi-token to a single-token (903). However, when the summary text is not used, the apparatus 200 for training the dialogue summary model changes only the speaker token of each of all speakers appearing in the dialogue text from the multi-token to the single-token.

Then, the apparatus 200 for training the dialogue summary model selects, as samples, as many dialogue text-summary text pairs as a preset batch size, among a plurality of dialogue text-summary text pairs (904). However, when the summary text is not used, the apparatus 200 for training the dialogue summary model selects, as samples, as many dialogue text as the batch size from among a plurality of dialogue texts.

Then, the apparatus 200 for training the dialogue summary model compares a probability value of a variable x, which is arbitrarily determined among rational numbers 0 or more and 1 or less for each utterance in each sample, with a preset threshold $x_{threshold}$, and determines whether to perform switching for each utterance (905).

Then, the apparatus 200 for training the dialogue summary model adds the corresponding utterance to a candidate pool related to switching utterance when the probability value of x is equal to or greater than $x_{threshold}$ (906), and does not add the corresponding utterance to the above-mentioned candidate pool when the probability value of x is less than or equal to $x_{threshold}$.

Then, the apparatus 200 for training the dialogue summary model arbitrarily switches all utterances added to the above-mentioned candidate pool, thereby generating a sample on which the switching utterance task is performed (907).

Then, the apparatus 200 for training the dialogue summary model compares a probability value of a variable β, which is randomly determined among rational numbers 0 or more and 1 or less for each utterance in each sample, with a preset threshold $β_{threshold}$, and determines whether to replace each speaker token of the dialogue text in each sample with a mask token (908).

Then, the apparatus 200 for training the dialogue summary model replaces the speaker token, which is the determination target, with the mask token when the probability value of β is less than or equal to $β_{threshold}$ (909), and does not replace the speaker token, which is the determination target, with the mask token when the probability value of β is greater than the $β_{threshold}$, thereby generating a sample on which the masking speaker task is further performed. However, in the embodiment described with reference to FIG. 9, whether to perform the masking speaker task is optional, and only the switching utterance task may be performed without additionally performing the masking speaker task. In this case, steps 908 and 909 may be omitted.

Then, the apparatus 200 for training the dialogue summary model determines whether the switching utterance task and masking speaker task through steps 905 to 909 have been performed on all the samples selected in step 904 (910). Of course, when steps 908 and 909 are omitted, the apparatus 200 for training the dialogue summary model may only determine whether the switching utterance task through steps 905 to 907 is performed on all selected samples.

Then, when the intended task has been performed on all the selected samples, the apparatus 200 for training the dialogue summary model performs prediction by inputting, into the natural language processing model, the sample on which the intended task has been performed (911), and when there is a sample on which the intended task is not performed among the selected samples, the apparatus 200 for training the dialogue summary model performs steps 905 to 909 or steps 905 to 907 on the corresponding sample.

In an embodiment, when the intended task is the switching utterance task, the apparatus 200 for training the dialogue summary model may perform prediction on whether utterances in each sample have been switched by inputting, into the natural language processing model, a sample on which the switching utterance task has been performed.

Meanwhile, in another embodiment, when the intended tasks are the switching utterance task and the masking speaker task, the apparatus 200 for training the dialogue summary model may perform prediction on whether utterances in each sample have been switched and prediction on original speaker tokens corresponding to masking tokens of utterances in each sample, by inputting, into the natural language processing model, samples on which the switching utterance task and the masking speaker task have been performed.

In this case, the natural language processing model may separately include a second prediction head performing prediction regarding masking, in addition to a first prediction head performing prediction regarding switching. This is due to the fact that when the shape of each prediction result is different, linear layers included in the prediction heads also have to be different.

Then, the apparatus 200 for training the dialogue summary model calculates a loss between the prediction result of the natural language processing model and the actual correct answer (912).

According to an embodiment, when both the prediction regarding switching and the prediction regarding masking are performed, the apparatus 200 for training the dialogue summary model may calculate a first loss between the prediction result of the switching of the natural language processing model and the actual correct answer corresponding thereto, and calculate a second loss between a prediction result of masking of the natural language processing model and an actual correct answer corresponding thereto.

In this case, the final loss in step 912 may be calculated in the form of a weighted sum based on the first loss and the second loss. In addition, in this case, a weight parameter applied to the weight sum may be a hyper parameter preset by the user.

The above embodiments related to the additional performance of the masking speaker task described above may be similarly applied to a pre-training method, which will be described below with reference to FIG. 10.

Then, the apparatus 200 for training the dialogue summary model updates the learning parameters of the natural language processing model based on the calculated loss (913).

Then, the apparatus 200 for training the dialogue summary model compares the calculated loss with a preset threshold $loss_{threshold}$, ends the pre-training of the natural language processing model when the loss is less than or equal to the loss threshold, and newly selects as many samples as a batch size preset through step 904 and repeats subsequent operations when the loss exceeds the loss threshold (914).

FIG. 10 is a flowchart for describing a method for pre-training a natural language processing model based on an inserting utterance task according to an embodiment.

The method illustrated in FIG. 10 may be performed, for example, by the apparatus 200 for training the dialogue summary model described above.

First, the apparatus 200 for training the dialogue summary model inserts a token at the beginning or end of each of utterances constituting a dialogue text to identify the beginning or end of the utterance (1001).

Then, the apparatus 200 for training the dialogue summary model combines the dialogue text and the summary text using the inserted token as a delimiter (1002). However, in the embodiment described with reference to FIG. 10, the use of the summary text is optional, and the inserting utterance task may be performed only for the dialogue text. In this case, step 1002 may be omitted.

Then, the apparatus 200 for training the dialogue summary model changes a speaker token of each of all speakers appearing in the combined dialogue text and summary text from a multi-token to a single-token (1003). However, when the summary text is not used, the apparatus 200 for training the dialogue summary model changes only the speaker token of each of all speakers appearing in the dialogue text from the multi-token to the single-token.

Then, the apparatus 200 for training the dialogue summary model selects, as samples, as many dialogue text-summary text pairs as a preset batch size, among a plurality of dialogue text-summary text pairs (1004). However, when the summary text is not used, the apparatus 200 for training the dialogue summary model selects, as samples, as many dialogue text as the batch size from among a plurality of dialogue texts.

Then, the apparatus 200 for training the dialogue summary model selects utterances within a reference number from other samples in the same batch (1005).

According to an embodiment, the number of utterances selected in step 1005 may be determined based on the number of utterances included in a dialogue text of a target sample on which the inserting utterance task is to be performed and a preset selection probability. In this regard, it is desirable that the selection probability is set to 1/3 or less.

For example, when 100 utterances are included in the dialogue text of the target sample, and the selection probability is set to 0.3, the apparatus 200 for training the dialogue summary model may determine 30, which is calculated by multiplying 100 by 0.3, as the number of utterances to be selected from other samples in the same batch.

According to an embodiment, the apparatus 200 for training the dialogue summary model may replace the speaker token for each of the selected utterances with a speaker token toke appearing in utterances included in the dialogue text of the target sample, prior to performing the following step 1006. This is to prevent the natural language processing model from easily predicting whether to insert an utterance by referring only to the speaker token, since the speaker of the utterance selected from other samples is highly likely to be different from the speaker in the target sample.

Then, the apparatus 200 for training the dialogue summary model inserts the utterance selected in step 1005 into the dialogue text of the target sample on which the inserting utterance task is to be performed (1006).

According to an embodiment, the apparatus 200 for training the dialogue summary model may arbitrarily select as many slots as the number of selected utterances from among the slots in respective utterances of the dialogue text of the target sample, and insert the selected utterance to each selected slot.

According to an embodiment, the apparatus 200 for training the dialogue summary model may perform step 1006 by using only some selected from among the samples selected in step 1004 as target samples. Inserting utterances into all samples may cause the natural language processing model to have a bias that at least one inserted utterance is necessarily present in all samples, and as a consequence, step 1006 is performed for preventing such a bias.

For example, the apparatus 200 for training the dialogue summary model may perform step 1006 by using, as target samples, only 90% of the samples selected in step 1004, which are arbitrarily re-selected.

Then, the apparatus 200 for training the dialogue summary model compares a probability value of a variable $\beta$, which is randomly determined among rational numbers 0 or more and 1 or less for each utterance in each sample, with a preset threshold $\beta_{threshold}$, and determines whether to replace each speaker token of the dialogue text in each sample with a mask token (1007).

Then, the apparatus 200 for training the dialogue summary model replaces the speaker token, which is the determination target, with the mask token when the probability value of $\beta$ is less than or equal to $\beta_{threshold}$ (1008), and does not replace the speaker token, which is the determination target, with the mask token when the probability value of $\beta$ is greater than the $\beta_{threshold}$, thereby generating a sample on which the masking speaker task is further performed. However, in the embodiment described with reference to FIG. 10, whether to perform the masking speaker task is optional, and only the inserting utterance task may be performed without additionally performing the masking speaker task. In this case, steps 1007 and 1008 may be omitted.

Then, the apparatus 200 for training the dialogue summary model determines whether the switching utterance task and masking speaker task through steps 1005 to 1008 have been performed on all the samples selected in step 1004 (1009). Of course, when steps 1007 and 1008 are omitted, the apparatus 200 for training the dialogue summary model may only determine whether the inserting utterance task through steps 1005 and 1006 is performed on all selected samples.

Then, when the intended task has been performed on all the selected samples, the apparatus 200 for training the dialogue summary model performs prediction by inputting, into the natural language processing model, the sample on which the intended task has been performed (1010), and when there is a sample on which the intended task is not performed among the selected samples, the apparatus 200 for training the dialogue summary model performs steps 1005 to 1008 or steps 1005 and 1006 on the corresponding sample.

Then, the apparatus 200 for training the dialogue summary model calculates a loss between the prediction result of the natural language processing model and the actual correct answer (1011).

Then, the apparatus 200 for training the dialogue summary model updates the learning parameters of the natural language processing model based on the calculated loss (1012).

Then, the apparatus 200 for training the dialogue summary model compares the calculated loss with a preset threshold $loss_{threshold}$, ends the pre-training of the natural language processing model when the loss is less than or equal to the loss threshold, and newly selects as many samples as a batch size preset through step 1004 and repeats subsequent operations when the loss exceeds the loss threshold (1013).

In the illustrated flowcharts in FIGS. 4 to 10, the method is divided into a plurality of steps; however, at least some of the steps may be performed in a different order, performed together in combination with other steps, omitted, performed in subdivided steps, or performed by adding one or more steps not illustrated.

Figure 11:
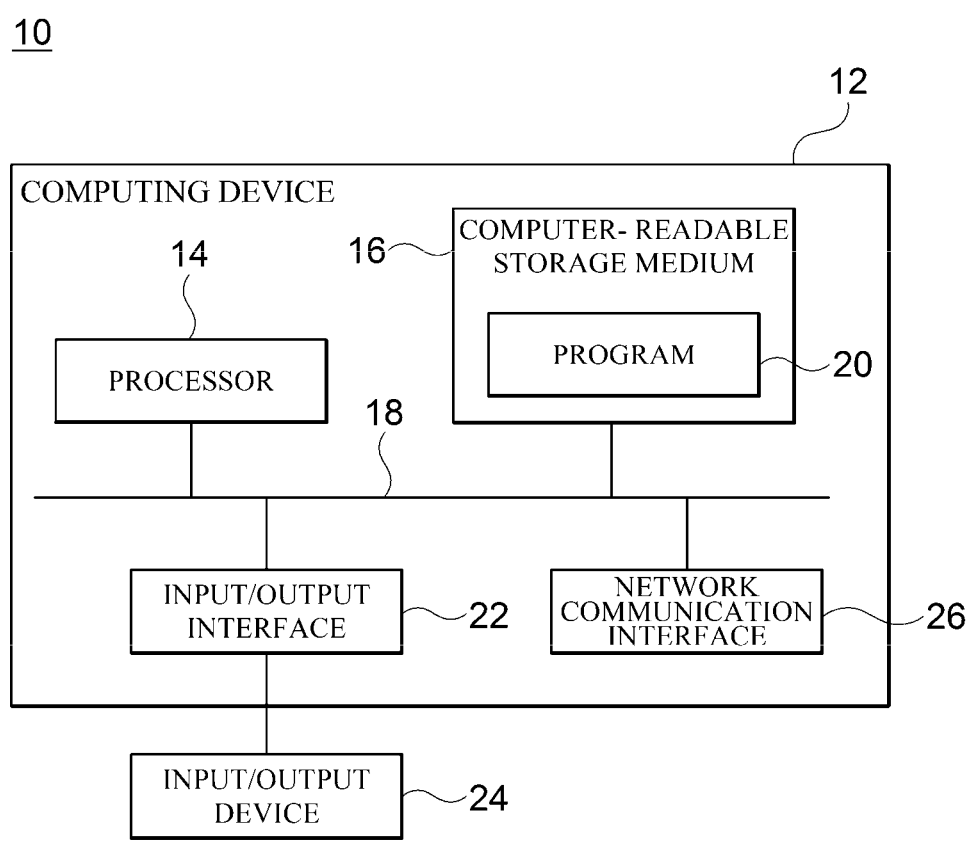
FIG. 11 is a block diagram for exemplarily illustrating a computing environment including a computing device according to an embodiment.

FIG. 11 is a block diagram for exemplarily illustrating a computing environment 10 including a computing device according to an embodiment. In the illustrated embodiment, each component may have different functions and capabilities in addition to those described below, and additional components may be included in addition to those described below.

The illustrated computing environment 10 includes a computing device 12. In this case, the computing device 12 may be the apparatus 100 for training the dialogue summary model according to an embodiment. In this case, the computing device 12 may be the apparatus 200 for training the dialogue summary model according to an embodiment.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random access memory, a non-volatile memory, or any suitable combination thereof), one or more magnetic disk storage devices, optical disc storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touchpad, a touch screen, or the like), a voice or sound input device, input devices such as various types of sensor devices and/or imaging devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

The above-described embodiments may be implemented by a hardware component, a software component, and/or a combination of a hardware component and a software component. For example, the apparatus, method, and components described in the embodiments may be implemented by using one or more general purpose computers or special purpose computers, for example, like a processor, controller, arithmetic logic unit (ALU), digital signal processor, microcomputer, field programmable gate array (FPGA), programmable logic unit (PLU), microprocessor, or any other device capable of executing and responding to instructions. A processing device may execute an operating system (OS) and one or more software applications executed on the operating system. Further, the processing device may also access, store, manipulate, process, and generate data in response to execution of the software. For convenience of understanding, in some cases, one processing device is described as being used, but it will be apparent to those skilled in the art that the processing device includes a plurality of processing elements and/or a plurality of types of processing elements. For example, the processing device may include a plurality of processors or one processor and one controller. Other processing configurations are also possible, such as parallel processors.

Software may include a computer program, code, instructions, or one or more combinations thereof, for independently or collectively instructing or configuring the processing device to operate as desired. Software and/or data may be permanently or temporarily embodied in any type of machine, component, physical or virtual equipment, computer storage medium or device, or in a propagated signal wave in order to be interpreted by the processing device or provide instructions or data to the processing device. Software may be distributed over network coupled computer systems so that the software is stored and executed in a distributed manner. Software and data may be stored in one or more computer-readable recording media.

According to the disclosed embodiments, by transferring the learning parameter values from the pre-trained natural language processing model to the dialogue summary model, it is possible to significantly reduce resources, such as time, cost, and model capacity that are required for training the dialogue summary model.

In addition, according to the disclosed embodiments, by applying the self-supervised learning technique in which the characteristics of dialogue texts are reflected during the pre-training of the natural language processing model, it is possible to not only perform pre-training with a small amount of training data, and also further reduce resources required for labeling the training data.

Although the representative embodiments of the present disclosure have been described in detail as above, those skilled in the art will understand that various modifications may be made thereto without departing from the scope of the present disclosure. Therefore, the scope of rights of the present disclosure should not be limited to the described embodiments, but should be defined not only by the claims set forth below but also by equivalents of the claims.

What is claimed is:

1. An apparatus for training a dialogue summary model, the apparatus comprising at least one processor to implement:
   a parameter transferer configured to transfer one or more learning parameter values of a natural language processing model, which is pre-trained, to a sequence-to-sequence-based dialogue summary model; and
   a model trainer configured to train the sequence-to-sequence-based dialogue summary model by using the transferred learning parameter values as initial values for learning parameters of each of an encoder and a decoder in the sequence-to-sequence-based dialogue summary model, wherein the natural language processing model is trained by selecting, as samples, dialogue text-summary text pairs of a preset batch size, and by self-supervised learning based on a masking speaker task using the selected samples, and wherein the masking speaker task is performed by:
comparing a probability value of a variable α, which is randomly determined for each sample, with a first preset threshold, the variable α being a rational number equal to or greater than 0 and equal to or less than 1; and for each sample, determining an execution target of the masking speaker task between a dialogue text and a summary text of a dialogue text-summary text pair, based on a result of the comparing.

2. The apparatus of claim 1, wherein each of the encoder and the decoder includes at least a portion of a network structure of the natural language processing model.

3. The apparatus of claim 1, wherein the model trainer is further configured to update the learning parameters of the sequence-to-sequence-based dialogue summary model based on a loss between an inferred summary text output by the sequence-to-sequence-based dialogue summary model receiving an input dialogue text and a correct answer summary text corresponding to the input dialogue text.

4. The apparatus of claim 1, wherein the model trainer is further configured to share at least some of learning parameter values of the encoder and at least some of learning parameter values of the decoder.

5. The apparatus of claim 1, wherein the masking speaker task is performed by:
comparing a probability value of a variable β, which is randomly determined for each utterance of a sample with a second preset threshold, the variable β being a rational number equal to or greater than 0 and equal to or less than 1; and determining whether to perform the masking speaker task for a corresponding utterance based on a result of the comparing the probability value of the variable β with the second preset threshold.

6. The apparatus of claim 1, wherein a begin of sentence (BOS) token is inserted at a beginning of each utterance constituting a first dialogue text and an end of sentence (EOS) token at an end of each utterance constituting the first dialogue text, and
wherein the first dialogue text and a summary text, corresponding to the first dialogue text, are combined to form a dialogue text-summary text pair by using the inserted BOS token and EOS token as a delimiter.

7. The apparatus of claim 1, wherein the natural language processing model is further trained by self-supervised learning based on at least one of a switching speaker task, a switching utterance task, or an inserting utterance task.

8. The apparatus of claim 7, wherein the masking speaker task is performed by replacing at least a portion of one or more speaker tokens included in one of the dialogue text and the summary text of the dialogue text-summary text pair, with a mask token; and
the natural language processing model is pre-trained based on a loss between a predicted result of the natural language processing model on a speaker token corresponding to a position of the mask token and the replaced speaker token.

9. The apparatus of claim 7, wherein the switching speaker task is performed by switching at least a portion of one or more speaker tokens included in one of the dialogue text and the summary text of the dialogue text-summary text pair; and
the natural language processing model is pre-trained based on a loss between a prediction result of the natural language processing model on whether or not switching has been performed for a speaker token of each utterance included in the dialogue text and a correct answer indicating whether or not there is actual switching.

10. The apparatus of claim 7, wherein the switching utterance task is performed by switching at least a portion of one or more utterances included in one of the dialogue text and the summary text of the dialogue text-summary text pair; and
the natural language processing model is pre-trained based on a loss between a prediction result of the natural language processing model on whether or not switching has been performed for each of the portion of one or more utterances included in the dialogue text and a correct answer indicating whether or not there is actual switching.

11. The apparatus of claim 7, wherein the inserting utterance task is performed by selecting one or more utterances from at least one dialogue text and at least one summary text included in the same batch and inserting the selected one or more utterances into a dialogue text to be input to the natural language processing model, and
the natural language processing model is pre-trained based on a loss between a prediction result of the natural language processing model on whether or not each utterance included in the dialogue text, which has been input to the natural language processing model, is inserted from another dialogue text and a correct answer indicating whether or not there is actual inserting.

12. The apparatus of claim 7, wherein the switching speaker task is performed by:
comparing a probability value of a variable γ, which is randomly determined for each utterance of a sample with a third preset threshold, the variable γ being a rational number equal to or greater than 0 and equal to or less than 1; and
determining whether to perform the switching speaker task for a corresponding utterance based on a result of the comparing the probability value of the variable γ with the third preset threshold.

13. The apparatus of claim 7, wherein the switching utterance task is performed by:
comparing a probability value of a variable x, which is randomly determined for each utterance of a sample with a fourth preset threshold, the variable x being a rational number equal to or greater than 0 and equal to or less than 1; and
determining whether to perform the switching speaker task for a corresponding utterance based on a result of the comparing the probability value of the variable x with the fourth preset threshold.

14. A method for training a dialogue summary model, comprising:
transferring one or more learning parameter values of a natural language processing model, which is pre-trained, to a sequence-to-sequence-based dialogue summary model; and
training the sequence-to-sequence-based dialogue summary model by using the transferred learning parameter values as initial values for learning parameters of each of an encoder and a decoder in the sequence-to-sequence-based dialogue summary model, wherein the natural language processing model is trained by selecting, as samples, dialogue text-summary text pairs of a preset batch size, and by self-supervised learning based on a masking speaker task by using the selected samples, and wherein the masking speaker task is performed by:
comparing a probability value of a variable $\alpha$, which is randomly determined for each sample, with a first preset threshold, the variable $\alpha$ being a rational number equal to or greater than 0 and equal to or less than 1; and for each sample, determining an execution target of the masking speaker task between a dialogue text and a summary text of a dialogue text-summary text pair, based on a result of the comparing.

15. The method of claim 14, wherein the training comprises updating the learning parameters of the sequence-to-sequence-based dialogue summary model based on a loss between an inferred summary text output by the sequence-to-sequence-based dialogue summary model receiving an input dialogue text and a correct answer summary text corresponding to the input dialogue text.

16. The method of claim 14, wherein the training comprises sharing at least some of learning parameter values of the encoder and at least some of learning parameter values of the decoder.

17. The method of claim 14, wherein the natural language processing model is further trained by self-supervised learning based on at least one of a switching speaker task, a switching utterance task, and an inserting utterance task.

18. The method of claim 17, wherein the masking speaker task is performed by replacing at least a portion of one or more speaker tokens included in one of the dialogue text and the summary text of the dialogue text-summary text pair with a mask token; and the natural language processing model is pre-trained based on a loss between a predicted result of the natural language processing model on a speaker token corresponding to a position of the mask token and the replaced speaker token.

19. The method of claim 17, wherein the switching speaker task is performed by switching at least a portion of one or more speaker tokens included in one of the dialogue text and the summary text of the dialogue text-summary text pair; and the natural language processing model is pre-trained based on a loss between a prediction result of the natural language processing model on whether or not switching has been performed for a speaker token of each utterance included in the dialogue text and a correct answer indicating whether or not there is actual switching.

20. The method of claim 17, wherein the switching utterance task is performed by switching at least a portion of one or more utterances included in one of the dialogue text and the summary text of the dialogue text-summary text pair; and the natural language processing model is pre-trained based on a loss between a prediction result of the natural language processing model on whether or not switching has been performed for each of the portion of one or more utterances included in the dialogue text and a correct answer indicating whether or not there is actual switching.

21. The method of claim 17, wherein the inserting utterance task is performed by selecting one or more utterances from at least one dialogue text and at least one summary text included in the same batch and inserting the one or more utterances into a dialogue text to be input to the natural language processing model; and the natural language processing model is pre-trained based on a loss between a prediction result of the natural language processing model on whether or not each utterance included in the dialogue text, which has been input to the natural language processing model, is inserted from another dialogue text and a correct answer indicating whether or not there is actual inserting.

22. The method of claim 14, wherein each of the encoder and the decoder includes at least a portion of a network structure of the natural language processing model.

* * * * *